No. 638,707. Patented Dec. 12, 1899.
T. GAUNT.
MANUFACTURE OF STARCH.
(Application filed Nov. 19, 1895. Renewed July 28, 1899.)
(No Model.)
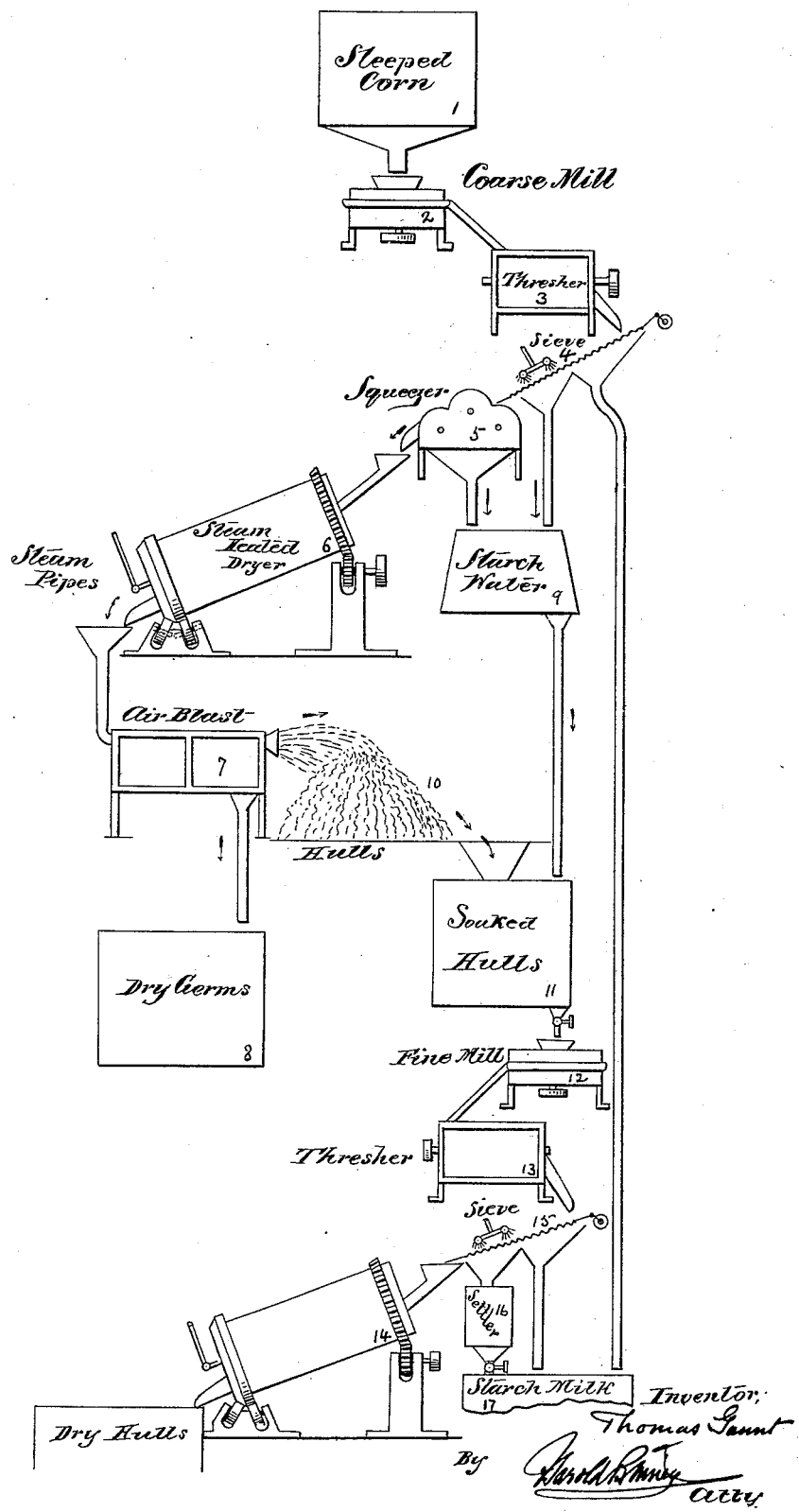

UNITED STATES PATENT OFFICE.

THOMAS GAUNT, OF PEORIA, ILLINOIS, ASSIGNOR OF TWO-THIRDS TO WILLIAM HAMLIN AND HARRY HAMLIN, OF BUFFALO, NEW YORK.

MANUFACTURE OF STARCH.

SPECIFICATION forming part of Letters Patent No. 638,707, dated December 12, 1899.

Application filed November 19, 1895. Renewed July 28, 1899. Serial No. 725,426. (No specimens.)

*To all whom it may concern:*

Be it known that I, THOMAS GAUNT, of Peoria, Illinois, have invented certain new and useful Improvements in Treating Corn, of which the following is a description.

The improved process is substantially applicable to the treatment of corn for the separation of germs, starch, feed, and the derivatives of starch. The various processes now known and in use, which include the separation of the germs, may be broadly classified as "wet" and "dry" processes. In the dry process the corn is coarsely ground and is then either agitated to effect the separation by the different gravities of the various constituents or is subjected to an air-blast which blows away the perisperm and starch, leaving the germs. This process has not in practice been very satisfactory owing to the fact that the germs are to a large extent broken up in grinding, or if not subjected to such severe treatment the starch and adherent matter is not properly loosened from the germs. In the wet process of separation the ground hulls and germs are immersed in a medium of specific gravity greater than the germs, but somewhat less than the hulls, and the germs therefore rise to the surface and may be skimmed off. This process also presents difficulties which interfere with its being carried out in a commercially-economic manner, except by the use of complicated apparatus.

The objects of the present invention are to effect the separation of germs, starch, feed, and gluten in a thoroughly simple, effective, and economic manner, and to do away with the objections and difficulties presented by either of the two classes of processes just outlined.

Briefly stated, the improved process in its completer aspect consists in steeping the corn to soften it, coarsely grinding and threshing it or beating it in a wet state, so that the germs may be loosened from the adherent starch and perisperm, washing the ground corn upon screens, so as to remove the loosened starch and leave only the hulls and germs, drying the commingled hulls and germs, separating the hulls from the germs by a dry-separation process, which may be either a blast of air or dry agitation, then again moistening the hulls in starch-milk already obtained from the screens, grinding the hulls in fine bur-mills with water, and then separating the starch from the feed by means of shaker-screens in the well-known manner, and settling the starch from the gluten-water upon starch-tables. This process, it will be seen, produces the germs already dried, the ground hulls, and gluten, which may be mixed together and dried to form the finished feed and the starch. By first steeping the corn for a suitable time in sulfurous-acid water and coarse-grinding it wet the hulls acquire a rubber-like toughness which enables them to pass through the coarse-grind mills and mixers and threshers without injury. By freeing the hulls and germs from the starch and loose gluten before attempting to separate the hulls from the germs a much greater yield of starch is produced and a much more economical separation of the hulls from the germs. As the germs must necessarily be dried for the extraction of corn-oil, there is no additional expense incurred in drying them before separation, and the amount of extra evaporation required to dry the hulls with the germs before separating the germs from the hulls is more than compensated by the great convenience and economy of the process and the greater yield of germs and greater freedom of the feed from the oil contained in the germs. Moreover, such portions of the germs as have almost invariably gotten into the hulls and starch when the corn is ground dry in the first instance materially interfere with the separation of the starch, probably because of the oily nature of the germs, and this objection also is removed by my improved process.

The annexed diagram gives an outline of the principal steps of the process, but is not intended to indicate details.

Preferably the corn is steeped for thirty hours or more in sulfurous-acid water of about three-tenths-per-cent. strength and at a temperature of from 130° to 120°. It is then ground in high-grind mills, which are so set that while they break the kernels into coarse fragments they cannot crush the germs. At this portion of the process the germ, having been steeped, is of a leather-like or rubber-like toughness, and can only be injured by direct crushing between hard surfaces. From the coarse-grind mills the ground corn, mixed with the sulfurous-acid water, is run through mixers, where it is violently stirred or agitated, and then passes through threshers, which while forcibly beating the coarsely-ground corn in no way injure the tough germs. From the threshers or beaters the coarsely-ground corn is run onto a shaker-screen, where it is treated with more sulfurous-acid water and the starch to a large extent washed from it. Up to this point the present invention and the one described in my prior application, filed September 1, 1896, serially numbered 604,509, are substantially identical. The heavy starch-milk obtained from this shaker is afterward screened on finer screens to separate such feed as may have passed through the first screens and is then ready to be run onto the starch-tables. The thin milk obtained from the lower end of the shakers, where the corn has been well washed, is used to again soak the hulls after they have been dried and separated from the germs. This separation of the hulls from the germs is accomplished by first running the hulls and germs through squeezers, which remove a large portion of the water contained, and then drying the hulls and germs and introducing them in the dry state into the dry-separator. Preferably the dry separation is effected by means of a draft of air, as will be well understood, though it must be noticed that in my process the hulls and germs have first been freed from a large amount of the starch. The germs are obtained in a dry state from the separator and are therefore all ready to be treated for the expressing of corn-oil and the production of oil-cake. The hulls are, however, taken from the separator and soaked with the thin starch-milk from the shaker-screen or from the squeezers and again ground very finely in fine-grind bur-mills. I find that these two successive grindings of the corn, first coarsely and then finely, in addition to separating the germs without injury result in the production of a very much finer feed, and also in the yield of a much greater quantity of starch. From the fine-grind mills the hulls are again washed on shaker-screens and a large yield of starch-milk obtained. This second grinding of the hulls in fine-bur mills, and, indeed, the subsequent treatment for the separation and drying of the feed and the separation of the starch and gluten-water, are substantially identical in this present process and in the process described in the application I have already referred to. The feed after being washed upon the shaker-screens may be run through squeezers or presses and finally dried and mixed with gluten. The starch-milk obtained from these shaker-screens, as well as the heavy starch-milk obtained from the shaker-screens used to separate the starch from the ground hulls and germs, may be treated by successive shaker-screens to extract such feed that has passed through the coarser mesh first used, and the starch then finally settled from the gluten-water upon the starch-tables.

Having now fully set forth the complete process which forms the subject-matter of this specification and having specifically set forth the several subprocesses or successive steps which distinguish it from other processes with which I am familiar, I claim and desire to secure by these Letters Patent of the United States—

The improved process of treating corn by coarsely grinding or partially reducing the previously-steeped corn in a wet state, separating the free starch liquor from the commingled hulls and germs, then subjecting the commingled hulls and germs to heat until dry, then subjecting the hulls and germs to an air-blast thereby separating the hulls from the germs; and subsequently finely grinding the hulls and treating them for the separation of starch.

In testimony whereof I have hereunto set my hand in the presence of the two subscribing witnesses.

THOMAS GAUNT.

Witnesses:
 THOMAS J. HARTY,
 CARRIE M. GILL.